United States Patent
Rieger et al.

(10) Patent No.: US 9,593,476 B2
(45) Date of Patent: Mar. 14, 2017

(54) COMBINATION OF VACUUM TOILET AND GREY WATER SYSTEM FUNCTIONS

(71) Applicant: Airbus Operations GmbH, Hamburg (DE)

(72) Inventors: Ulrich Rieger, Hamburg (DE); Marc Scheel, Hamburg (DE); Frank Schneider, Hamburg (DE); Matthias Mueller, Harsefeld (DE); Sascha Koenigsfeld, Hamburg (DE); Holger Brilsky, Hamburg (DE); Michael Rempe, Hamburg (DE)

(73) Assignee: Airbus Operations GmbH (DE)

( * ) Notice: Subject to any disclaimer, the term of this patent is extended or adjusted under 35 U.S.C. 154(b) by 455 days.

(21) Appl. No.: 13/945,246

(22) Filed: Jul. 18, 2013

(65) Prior Publication Data
US 2014/0020167 A1    Jan. 23, 2014

Related U.S. Application Data

(60) Provisional application No. 61/674,454, filed on Jul. 23, 2012.

(30) Foreign Application Priority Data

Jul. 23, 2012 (EP) .................................. 12177544

(51) Int. Cl.
*E03D 5/00* (2006.01)
*B64D 11/02* (2006.01)
*E03F 1/00* (2006.01)

(52) U.S. Cl.
CPC .............. *E03D 5/003* (2013.01); *B64D 11/02* (2013.01); *E03F 1/006* (2013.01); *Y02T 50/46* (2013.01); *Y10T 29/49826* (2015.01)

(58) Field of Classification Search
CPC . E03D 5/003; E03D 5/00; E03D 5/024; E03F 1/006; E03F 1/007; B64D 11/02
USPC .............................. 4/665, 314, 321, 323, 664
See application file for complete search history.

(56) References Cited

U.S. PATENT DOCUMENTS

| | | | |
|---|---|---|---|
| 4,358,864 A † | 11/1982 | Medrano | |
| 5,035,011 A † | 7/1991 | Rozenblatt | |
| 5,201,082 A † | 4/1993 | Rockwell | |
| 5,251,346 A † | 10/1993 | Donati | |
| 5,317,766 A † | 6/1994 | McDonald | |
| 5,813,047 A † | 9/1998 | Teichroeb | |

(Continued)

FOREIGN PATENT DOCUMENTS

| | | |
|---|---|---|
| DE | 10 2005 045 343 A1 | 4/2007 |
| EP | 0 363 012 A1 | 4/1990 |
| EP | 1 690 789 A2 | 8/2006 |

*Primary Examiner* — J. Casimer Jacyna
(74) *Attorney, Agent, or Firm* — Lerner, David, Littenberg, Krumholz & Mentlik, LLP

(57) ABSTRACT

A combined toilet grey water system for passenger transportation vehicles such as aircrafts includes a toilet bowl for receiving waste water and a basin for receiving grey water. Moreover, the system includes a flushing line and a flushing valve with an inlet and an outlet. The outlet of the flushing valve is connectable to a vacuum waste water system. The inlet of the flushing valve is connected via the flushing line to the toilet bowl. Therein, the basin is connected to the flushing line in such a way that the basin is connectable to the vacuum waste water system.

7 Claims, 3 Drawing Sheets

(56) References Cited

U.S. PATENT DOCUMENTS

| | | | |
|---|---|---|---|
| 6,006,373 A | 12/1999 | Hoang | |
| 7,118,677 B2 † | 10/2006 | Hoffjann | |
| 7,947,164 B2 † | 5/2011 | Hoffjann | |
| 2004/0133968 A1 * | 7/2004 | Hoehne | B64D 11/02 4/233 |
| 2006/0225200 A1 | 10/2006 | Wierenga | |
| 2007/0068575 A1 | 3/2007 | Hoffjann et al. | |
| 2008/0295237 A1 * | 12/2008 | Kurtz | E03D 5/003 4/322 |
| 2010/0126233 A1 * | 5/2010 | Okros | D06F 39/006 68/12.13 |
| 2013/0036539 A1 † | 2/2013 | Zahir | |
| 2013/0305444 A1 † | 11/2013 | Boodaghians | |

\* cited by examiner
† cited by third party

COMBINATION OF VACUUM TOILET AND GREY WATER SYSTEM FUNCTIONS

CROSS-REFERENCE TO RELATED APPLICATIONS

This application claims the benefit of the filing date of European Patent Application No. 12 177 544.9 filed Jul. 23, 2012 and of U.S. Provisional Patent Application No. 61/674,454 filed Jul. 23, 2012, the disclosure of which applications is hereby incorporated herein by reference.

FIELD OF THE INVENTION

The present invention relates to the combination of vacuum toilet and grey water system functions. In particular, the present invention relates to a combined toilet and grey water system for passenger transportation vehicles. Furthermore, the present invention relates to a method for producing such combined toilet and gray water system. Moreover, the present invention relates to an aircraft with a corresponding toilet and grey water system.

BACKGROUND OF THE INVENTION

Most passenger transportation vehicles comprise a grey water system and a waste water system. Therein, grey water may be used water from drinking water systems and washing basins. Waste water, also denoted as black water, may be contaminated water such as toilet waste water and sewage.

Usually the grey water system and the waste system are designed as separate independent systems. While the waste water system is adapted for accumulating and storing waste water in a waste water tank, the grey water system is adapted for discharging the grey water outside the vehicle. In case of aircrafts the grey water has to be drained overboard without building ice formations at the aircraft fuselage in case of low temperatures. For this purpose heated draining masts may be provided at the vehicle.

Alternatively, the grey water may be released into the waste water tank. However, an additional transfer unit with security valves is necessary at the connection of the grey water and the waste water systems for preventing waste water from flowing back to galleys and basins. Such a transfer unit is known for example from DE 10 2005 045 343 A1 or US 2007 0 068 575 A1.

BRIEF SUMMARY OF THE INVENTION

There may be a need for a possibility to provide a reliable and simplified grey water disposal which allows to store grey water in a waste water tank and at the same time to reduce the complexity and weight of existing systems.

According to a first aspect of the present invention a combined toilet grey water system for passenger transportation vehicle is provided. The system comprises a toilet bowl for receiving waste water and a basin for receiving grey water. Moreover, the system comprises a flushing line and a flushing valve with an inlet and an outlet. The outlet of the flushing valve is connectable to a vacuum waste water system. The inlet of the flushing valve is connected to the toilet bowl via the flushing line. Therein, the basin is connected to the flushing line in such a way that the basin is connectable to the vacuum waste water system.

In other words, the idea of the present invention according to the first aspect is based on including the functions of a grey water transfer unit into a vacuum toilet assembly. Therein, the grey water may leave the basin via a toilet assembly and be guided directly into a waste water tank. I.e. a direct connection between a basin and a waste water tank is provided. Therein, the security valves present in the vacuum toilet assembly are employed also for the grey water from the basin. Thus, a transfer unit is no longer necessary and the construction may be simplified.

Advantageously, the combined toilet and grey water system, also denoted as combined toilet assembly (CTA), makes a separate transfer unit for grey water dispensable by employing the existing valves and security features of a toilet assembly. Therefore, a reduced number of equipment parts is necessary and the weight of the equipment may be reduced in this way, which is particularly advantageous in aircrafts. Moreover, the number of necessary interfaces is reduced, as compared to known systems, in which a toilet assembly has a first interface to the waste water system and a basin has a separate second interface, such as a transfer unit, to the waste water system. The reduced number of interfaces entails also a deletion or a reduction of maintenance tasks.

Furthermore, the robustness of the outflow of the basin may be enhanced with the system according to an embodiment of the present invention. Therein, in known systems waste water tubing may provide pipes or hoses with a smaller diameter than used in vacuum tubes. E.g. the diameter of a waste water tube may have a diameter of about 1", while a vacuum tube has a diameter of about 2". Drainage in known waste water systems is done per gravity only, as there is no airflow like in vacuum systems. Therefore, current washbasin outflows are protected by a sieve in order to prevent foreign object ingress and respectively clogged waste water lines. As according to an embodiment of the invention the basin of the combined toilet assembly is connected to vacuum tubes which have a greater diameter than waste water tubes and furthermore due to the supported by the air stream of the vacuum system caused by cabin-ambient pressure difference the sieve at the basin may be omitted.

Due to the simplified design and the reduction of equipment parts an installation of lavatories on passenger transportation vehicles may be simplified. Furthermore, the production and maintenance costs may be reduced with the systems according to the present invention.

The combined toilet grey water system may be used on passenger transportation vehicles such as aircrafts, trains, busses and ships. The system comprises a toilet bowl and a basin. These components may for example be installed in a lavatory at the cabin of the vehicle. Furthermore, a basin may for example be installed as a hand washing basin or as a galley sink. The toilet bowl and the basin may be containers with a volume for receiving liquid. Therein, the shape of the container may be arbitrary.

The system further comprises a flushing valve with an inlet and an outlet. The flushing valve may represent the interface between the toilet and the waste water system, and also between the basin and the waste water system. The flushing valve may also comprise several inlets and outlets. Furthermore, the flushing valve may be designed as a disc valve, a one way valve and/or a ball valve. The valve may be adapted to regulate and control the flow of waste water from the toilet bowl and of the grey water from the basin. Particularly, the flushing valve may prevent a backflow of liquid from the vacuum waste water system to the basin and to the toilet bowl. Moreover, the flushing valve may be actuated automatically by a control unit. Therein, it may be actuated mechanically, magnetically, electrically, pneumatically or hydraulically. The flushing valve may be actuated to open e.g. when a certain fill level in the toilet, in the basin and/or in the flushing line is reached. Furthermore, the flushing valve may be actuated by a user by an actuation element such as a flushing button after using the lavatory.

The outlet of the flushing valve is connectable to a vacuum waste water system. I.e. when the system is installed in a passenger transportation vehicle, the flushing valve is connected to a vacuum waste water system. The vacuum waste water system may comprise a waste water tank and a vacuum tubing system which for example in airplanes may be connected to the outside of the vehicle and use the pressure difference between the inside of a passenger cabin and the outside at high altitudes.

The inlet of the flushing valve is connected to the toilet bowl via the flushing line. The flushing line may for example be a short tubing section between the outlet of the toilet bowl and the vacuum waste water system.

The basin is also connected to the flushing line. For example, a so called grey water line may connect the basin to the flushing line. Thus, when the flushing valve is opened grey water from the basin and/or from the flushing line is drained into the vacuum waste water system. Therein, the grey water may be drained from the combined toilet grey water system together with waste water from the toilet bowl or separately, if no waste water is present in the system.

According to an exemplary embodiment of the present invention the basin is connected directly to the flushing line. I.e. the basin is connected to the flushing line via a direct line, e.g. denoted as grey water line. The outlet of the grey water line may be connected to the flushing line between the outlet of the toilet bowl and the inlet of the flushing valve. Alternatively, the outlet of the grey water line may be arranged at the inlet of the flushing valve.

According to a further exemplary embodiment of the present invention the basin is connected to the flushing line via the toilet bowl. I.e. the basin is connected directly to the toilet bowl via the grey water line and the bowl is connected directly to the flushing line. In this way, the grey water from the basin may be used as flushing water for the toilet bowl. Thus, the fresh water necessary for a flushing process may be advantageously reduced. Furthermore, a direct connection of the basin to the toilet bowl would entail only minor changes on current toilet systems. Therefore, existing toilet assemblies may be easily upgraded to form the combined toilet grey water system.

According to a further exemplary embodiment of the present invention the system further comprises a reservoir. Therein, the reservoir is located at the flushing line and is adapted for accumulating grey water.

The reservoir may be integrated into the flushing line or alternatively into the grey water line or at the connection of the flushing line and the grey water line. Therein, the integration of the reservoir into the flushing line or into the grey water line may denote that the pipes or tubes of the respective line comprise a larger diameter than other pipes of the system. The pipe area with the larger diameter represents the reservoir. Alternatively, the reservoir may be a container or a vessel connected to the respective line.

The reservoir may be adapted to accumulate grey water, for example, of several hand washings. E.g. the volume of the reservoir may correspond to three to five volumes of the amount of water normally used to wash hands. Due to the employment of the reservoir, the flushing valve is not necessarily actuated e.g. after each hand washing. The grey water may be accumulated in the reservoir and be released from the reservoir and from the flushing line together with waste water when a user actuates a flushing device. In this way, on the one hand energy may be saved because less actuations of the flushing valve are necessary. On the other hand, more grey water may be used for the flushing of the toilet and thus more fresh water may be saved.

According to a further exemplary embodiment of the present invention the flushing valve is designed as a rotary valve or as a one way valve. The one way valve may also be denoted as a non return valve and may only allow a flow from the flushing line into the vacuum waste water system.

Furthermore, the flushing valve may be a rotary valve, in which the rotation of a passage or several passages in a plug which blocks the passage in a line regulates the flow of the fluid. For example, the rotary valve may be a disc valve. The disc valve may comprise a rotational axis which is arranged in parallel to the longitudinal axis of the line or in parallel to the flow in the line. The disc may comprise an opening which may be arranged eccentrically on the disc and which may be rotated to be flush with a line of the waste water system and with the flushing line. When the opening is not flush with the line of the waste water system, a solid part of the disc valve bocks the passage between the flushing line and the waste water system.

Alternatively, the rotary valve may be designed as a ball valve. The ball valve may comprise a spherical disc with an opening through the middle of the sphere. When the opening or port is in line with the flushing line and a vacuum waste water line, a flow may occur.

At the beginning of the opening process of the rotary valve, the passage between the flushing line and the vacuum waste water system is small which leads to the pressure difference acting on a small area and to a noise when the flushing valve is opened. With the help of the system according to an embodiment of the invention this noise is attenuated because the flushing line and/or the reservoir are filled with waste water and grey water when the flushing valve opens. Thus, a volume of fluid is located between the source of the noise and the passenger cabin. Therefore, with the system according to the invention undesirable flushing noises are attenuated.

According to a further exemplary embodiment of the present invention the system further comprises a grey water line and a first one way valve. The grey water line connects the basin to the toilet bowl or possibly to the flushing line. The first one way valve is positioned in the grey water line and is adapted to open when a fill level of the gray water line is reached and/or when a flushing device is actuated by a user. Therein the first one way valve may be actuated prior to or at the same time as the flushing valve.

The first one way valve may be employed to keep the grey water in the grey water line or in a reservoir connected to the grey water line, such that the accumulated grey water may be used for a flushing process of the toilet bowl. This is particularly advantageous if the grey water line is connected directly to the toilet bowl. The first one way valve may for example be denoted as a non return valve.

The first one way valve is located for example in the vicinity of the toilet bowl in the grey water line. It stays closed until it is actuated either by a flushing device or by a control unit. Therein, the flushing device may for example be a button actuated by a user after using the toilet bowl. A control unit may for example be a central processing unit (CPU) as described below.

According to a further exemplary embodiment of the present invention the system further comprises an odor stop element which is arranged between the basin and the flushing line. The odor stop element is adapted to prevent gases from leaving the flushing line and particularly the grey water line, through the basin.

For example, the odor stop element may be designed as a trap, also denoted as a trap plumbing. The trap may be a U-shaped, an S-shaped or a J-shaped part of the line or pipe arranged below the basin. Therein, grey water may be held by gravity in the bendings of the trap and act as a barrier for gases from the waste water system and from the flushing line. Moreover, the odor stop element may comprise parting liquids which have a density lower than the density of water. Such that the parting liquids block any gases coming from the waste water system.

Alternatively or additionally, the odor stop element may comprise a rubber sleeve which may only open if pressurized from above by grey water coming from the basin. Furthermore, the odor stop element may be designed as a check valve. The odor stop element is preferably arranged in the vicinity of the outlet of the basin in the grey water line.

According to a further exemplary embodiment of the present invention the system further comprises a control unit and a first fill level sensor. The first fill level sensor is adapted for determining a fill level of grey water in the system and for transmitting the determined fill level to the control unit. The control unit is adapted for comparing the determined fill level with a predeterminable fill level threshold value. Moreover, the control unit is adapted for opening the flushing valve when the determined fill level exceeds the fill level threshold value.

The control unit may be located within or in the vicinity of the combined toilet grey water system. Alternatively, the control unit may be located at a remote location from the system. Therein, the control unit may be functionally connected to the system electrically e.g. via wires or alternatively wirelessly. Besides receiving the fill level from the first fill level sensor the control unit may be adapted to check whether the waste water tank is full and whether enough vacuum is present in the waste water system. If for example, the pressure difference is not high enough between the cabin of the vehicle and the outside, as during service of an aircraft on the ground, the control unit may actuate a vacuum generator if necessary.

The control unit is adapted for comparing the fill level determined by a first fill level sensor with a predetermined fill level threshold value. The threshold value may for example be stored on a memory unit of the control unit. The control unit is further adapted for opening the flushing valve when the determined fill level exceeds the fill level threshold value or when the flushing device is actuated by a user.

The first fill level sensor may for example be a pressure sensor or a contact sensor and may comprise a floating element. Furthermore, several first fill level sensors may be located in the system. Therein, each first fill level sensor may be adapted to transmit the respective determined fill level to the control unit. In the control unit for each of the first fill level sensors a different fill level threshold value may be stored. The first fill level sensors may be adapted to transmit the determined fill level electronically via wires or wirelessly.

According to a further exemplary embodiment of the present invention the first fill level sensor is arranged at at least one of the following locations: at the flushing line, at the toilet bowl, at the reservoir or at the grey water line. I.e. several sensors may be arranged at the system. For example, a first fill level sensor A may be arranged at or in the flushing line, a further first fill level sensor B may be arranged at or in the toilet bowl, a further first fill level sensor C may be arranged at or in the reservoir and a further first fill level sensor D may be arranged at or in the grey water line.

According to a further exemplary embodiment of the present invention the system further comprises a bypass line with an air inlet. Therein, the bypass line connects the flushing line to the air inlet such that air is sucked into the vacuum waste water system through the inlet if the flushing valve is open and no grey water is present in the flushing line. In this way noise attenuation is achieved also if no fluid is present in the flushing line. The bypass line allows air e.g. from the cabin of an aircraft to be sucked in into the vacuum waste water system. Moreover, the grey water line from the basin may be connected to the bypass line such that grey water from the basin may enter the flushing line via the bypass line. The air inlet of the bypass line may be arranged above the basin.

According to a further exemplary embodiment of the present invention a second fill level sensor is arranged at the bypass line. The second fill level sensor is adapted for determining a fill level of grey water in the bypass line for preventing an overflow through the air inlet. For this purpose the second fill level sensor may be designed similar to the first fill level sensor. The second fill level sensor may be connected to the control unit and adapted for transmitting the determined fill level value to the control unit. The control unit may compare the fill level value determined by the second fill level sensor with a predetermined second fill level threshold value and actuate the flushing valve to open if the determined fill level value exceeds the second fill level threshold value.

According to a further exemplary embodiment of the present invention the system further comprises a second one way valve which opens only to let air flow into the bypass line through the air inlet. In this way an overflow of grey water through the air inlet may be prevented. The second one way valve may be designed as a non return valve. Alternatively, the second one way valve may be designed as a floating element or swimmer.

According to a second aspect of the present invention a method for producing the combined toilet grey water system described above is presented. The method comprises: providing a toilet bowl for receiving waste water; providing a basin for receiving grey water; connecting the toilet bowl and the basin to a flushing line; connecting an inlet of a flushing valve to the flushing line; and connecting an outlet of the flushing valve to a vacuum waste water system. Therein, the basin is connected to the flushing line in such a way that the basin is connectable to the vacuum waste water system.

According to a third aspect of the present invention an aircraft is presented. The aircraft comprises a vacuum tubing system, a waste water tank and a combined toilet grey water system according as described above. The vacuum tubing system is arranged to connect the waste water tank with an outlet of a flushing valve of the combined toilet grey water system. Therein, the waste water from the toilet and the grey water from the basin are disposable through the flushing valve into the waste water tank.

It has to be noted that embodiments of the invention are described with reference to different subject matters. In particular, some embodiments are described with reference to method type claims whereas other embodiments are described with reference to device or system type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

BRIEF DESCRIPTION OF THE DRAWINGS

Exemplary embodiments of the invention will be described in the following with reference to the following drawings.

DETAILED DESCRIPTION

Figure 1:
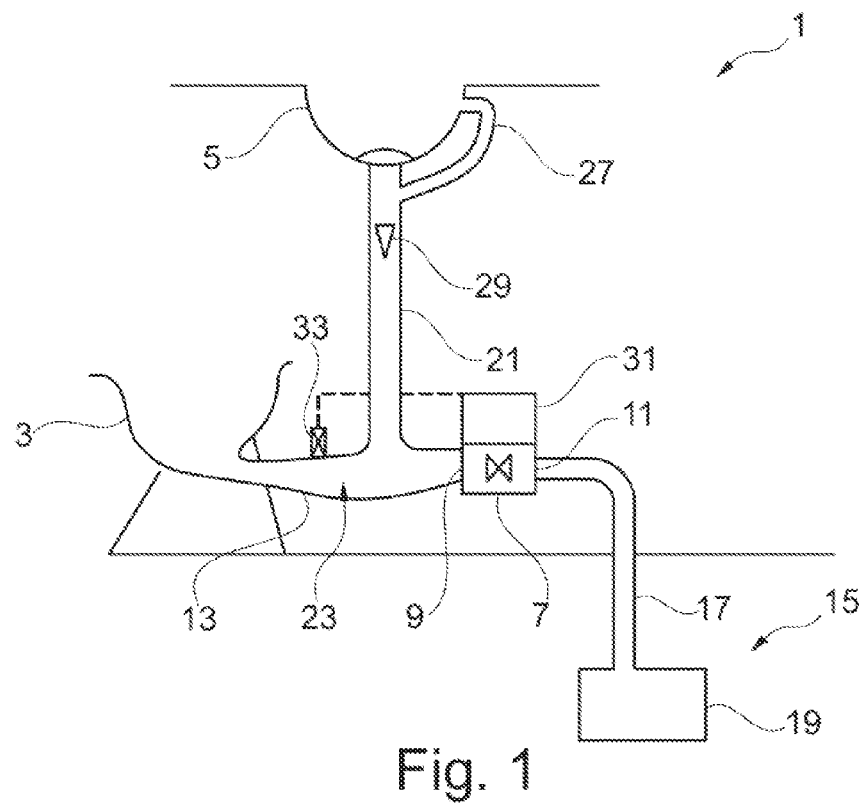
FIG. 1 shows schematically a cross section of a combined toilet grey water system according to a first exemplary embodiment of the invention

In FIG. 1 a combined toilet grey water system 1 is presented. The combined toilet grey water system 1 combines the functions of a grey water transfer unit and a vacuum toilet assembly. A separate grey water transfer unit in known designs may be installed in aircrafts to collect grey water (e.g. from washbasins in lavatories and sinks in galleys) and transfer it into the vacuum toilet system. The combined toilet grey water system 1 according to an embodiment of the invention provides this functionality in addition to the normal or usual vacuum toilet assembly functions.

The combined toilet grey water system 1 comprises a toilet bowl 3 for receiving waste water and a basin 5 for receiving grey water. Furthermore, the combined toilet grey water system 1 comprises a flushing line 13 and a flushing valve 7 with an inlet 9 and an outlet 11. The outlet 11 of the flushing valve 7 is connected to a vacuum waste water system 15 as shown schematically in FIG. 1. Therein, the waste water system 15 may comprise a vacuum tubing system 17 which connects the combined toilet grey water system 1 to a waste water tank 19.

The inlet 9 of the flushing valve 7 is connected via the flushing line 13 to the toilet bowl 3 such that waste water may leave the toilet bowl 3 through the flushing valve 7. Moreover, the basin 5 is connected to the flushing line 13 in such a way that the basin 5 is connected to the vacuum waste water system 15. Particularly, the basin 5 is connected to the flushing line 13 by a grey water line 21. Thus, the grey water from the basin 5 may be released into the vacuum waste water system 15 by way of the flushing valve 7 already present in the toilet assembly. As the flushing valve 7 already provides the necessary back flow security no separate grey water transfer unit is necessary.

As shown in FIG. 1 the basin 5 may be provided with an overflow line 27 to prevent the grey water from overflowing the basin 5. Moreover, a sieve may be located between the basin 5 and the grey water line 21. In the grey water line 21 an odor stop element 29 is provided which prevents gases from the waste water system 15 and particularly from the flushing line 13 from leaving the system 1 via the basin 5.

In the embodiment shown in FIG. 1 the basin 5 is connected via the grey water line 21 directly to the flushing line 13. The flushing line 13 comprises an integrated reservoir 23 for storing grey water. The flushing line 13 is designed with a great expansion in the longitudinal direction and with a large diameter compared to usual flushing lines 13. Thus, the reservoir 23 with a large volume is formed within the system 1. The reservoir 23 may advantageously attenuate any flushing noises by providing a large volume of liquid between the flushing valve 7 and an opening of the toilet bowl 3 or of the basin 5.

The grey water coming from the basin may be collected in the reservoir 23, i.e. in the flushing line 13 and be flushed into the vacuum waste water system 15 with the next actuation of a flushing device e.g. by a user of the lavatory.

For example, the reservoir 23 may be designed to accommodate three to five times the volume of the amount of water normally used to wash hands. Therein, a first fill level sensor 33 is provided at the reservoir 23, i.e. at the flushing line 13. The first fill level sensor 33 determines the current level of fluid in the reservoir 23 and transmits it to a control unit 31. The control unit 31 compares the determined value with a fill level threshold value. If the current fill level exceeds the threshold value the control unit 31 opens the flushing valve 7 before a user actuates a flushing device after using the lavatory. Furthermore, the control unit 31 is adapted to check whether enough vacuum is present in the vacuum waste water system 15 and also the check whether the waste water tank 19 is already full.

Figure 2:
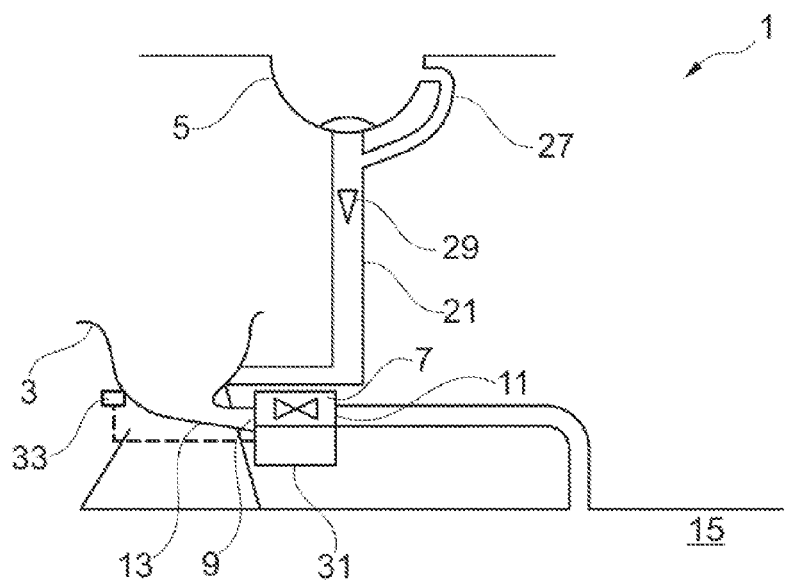
FIG. 2 shows schematically a cross section of a combined toilet grey water system according to a second exemplary embodiment of the invention

In FIG. 2 an alternative embodiment of the combined toilet grey water system 1 is presented. Therein, contrary to the embodiment of FIG. 1 the basin 5 is connected via the toilet bowl 3 to the flushing line 13. In this case the dimensions of the flushing line 13 are smaller than in the embodiment of FIG. 1 because the toilet bowl 3 functions as a reservoir 23 in FIG. 2.

The grey water line 21 connects the basin 5 directly to the toilet bowl 3. In this way, for example hand washing water may also be used as flushing water for the toilet bowl 3. In the embodiment of FIG. 2 the first fill level sensor 33 is located at the toilet bowl 3. If the fill level within the toilet bowl 3 reaches a predetermined level the control unit 31 actuates the flushing valve 7 to open and release the grey water into the vacuum waste water system 15. If a user uses the toilet bowl 3 and actuates a flushing device before the predetermined fill level is reached, the grey water is released together with the waste water into the vacuum waste water system 15. This may save energy and fresh water for flushing the toilet bowl 3. Moreover, the embodiment shown in FIG. 2 requires only minor adaptations or changes of existing toilet assemblies.

Figure 3:
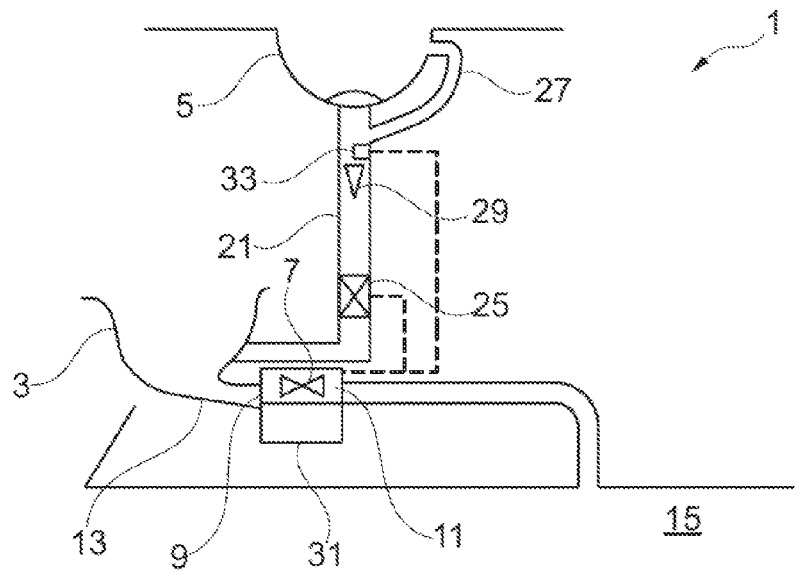
FIG. 3 shows schematically a cross section of a combined toilet grey water system according to a third exemplary embodiment of the invention

In FIG. 3 a further embodiment of the combined toilet grey water system 1 is shown. The embodiment shown in FIG. 3 enhances the use of grey water from the basin 5 for flushing the toilet bowl 3. In addition to the embodiment shown in FIG. 2, a first one way valve 25 is arranged in the grey water line 21. Therein, the grey water line 21 may be designed as a reservoir 23 e.g. with a greater diameter than in the previous embodiments. The grey water may be accumulated in the grey water line 21 until a user actuates a flushing device. When the user actuates the flushing device, the first one way valve may be opened automatically, e.g. by the control unit 31. Then, the grey water passes the toilet bowl 3 on its way to the vacuum waste water system 15. In this way, fresh water for flushing the toilet may be saved.

In the embodiment in FIG. 3 the first fill level sensor 33 may be arranged at the grey water line 21 for determining whether the first one way valve 25 and/or the flushing valve 7 should be opened prior to the initiation of a flushing process by a user. The first fill level sensor 33, the first one way valve 25 and the flushing valve 7 may be functionally connected to the control unit 31 for this purpose. The connection may be realized electronically or wirelessly.

Figure 4:
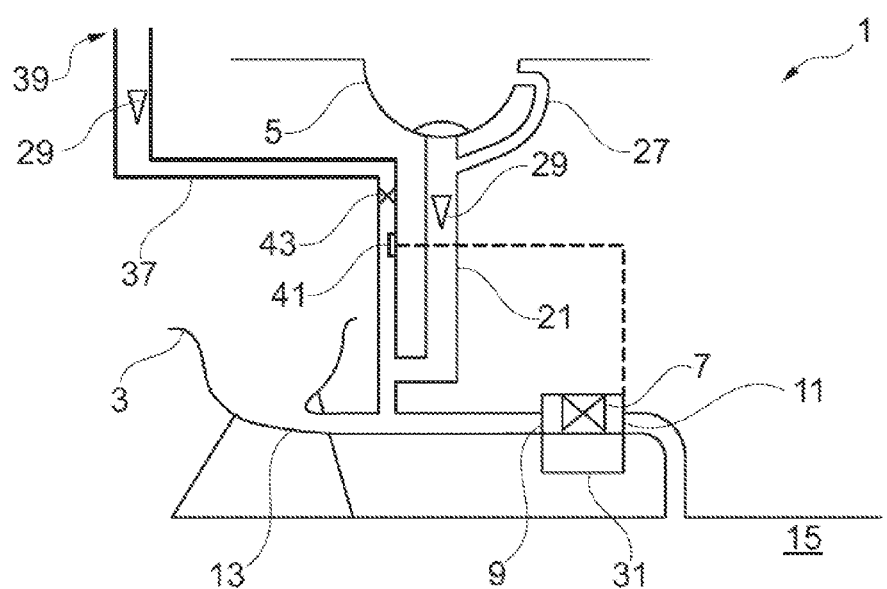
FIG. 4 shows schematically a cross section of a combined toilet grey water system according to a forth exemplary embodiment of the invention

FIG. 4 shows an embodiment similar to the embodiment shown in FIG. 2. However, contrary to FIG. 2 the grey water line 21 is not connected to the toilet bowl 3. The grey water line 21 of the combined toilet grey water system 1 in FIG. 4 is connected to a bypass line 37 with an air inlet 39 such that grey water from the basin 5 may enter the flushing line 13 via the bypass line 37. Therein, the bypass line 37 connects the flushing line 13 to the air inlet 39 such that air is sucked into the vacuum waste water system 15 through the air inlet 39 if the flushing valve 7 is open and no grey water is present in the flushing line 13. In this way noise attenuation is achieved also if no fluid is present in the flushing line 13. Due to the connection of the flushing line 13 to the air inlet 39 noises during an opening process of the flushing valve 7 are attenuated.

In addition to a first fill level sensor 33 (not shown in FIG. 4) which may be arranged at the reservoir 23, a second fill level sensor 41 is arranged at the bypass line 37. The second fill level sensor 37 is connected wirelessly or by wires to the control unit 31 and is adapted for determining a fill level of grey water in the bypass line 37. This enables the control unit 31 to prevent an overflow through the air inlet 39 by opening the flushing valve 7 if the determined fill level exceeds a predetermined second fill level value.

In addition to the second fill level sensor 41 or as an alternative to the second fill level sensor 41 a second one way valve 43 is provided at the bypass line 37. The second one way valve 43 opens only to let air flow into the bypass line 37 through the air inlet 39 and prevents an overflow of grey water through the air inlet 39. Moreover, an odor stop element 29 may be provided at the bypass line 37. The odor stop element 29 may be designed similar to the odor stop element 29 arranged at the grey water line 21. Moreover, the odor stop element 20 may be adapted to prevent gases from leaving the flushing line 1) through the bypass line 37.

Figure 5:
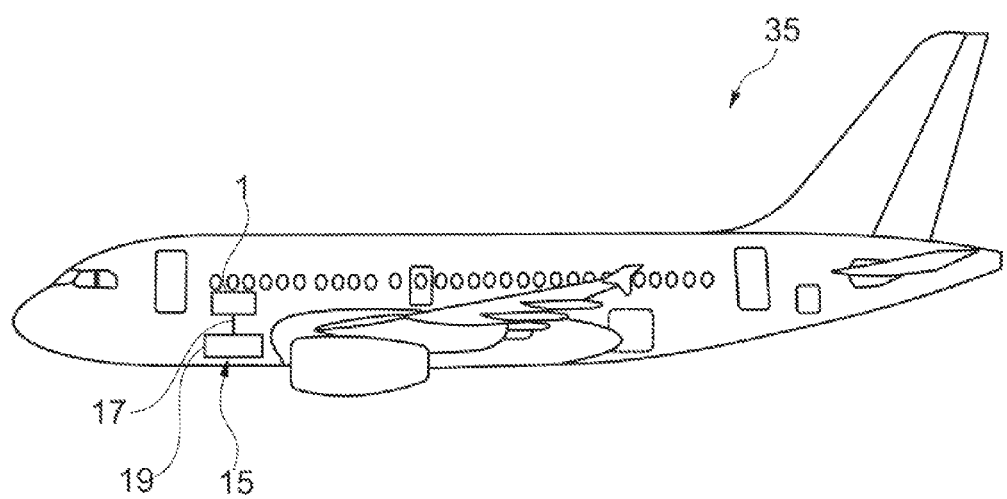
FIG. 5 shows schematically an aircraft with a combined toilet grey water system according to an exemplary embodiment of the invention

In FIG. 5 an aircraft 35 is shown. The aircraft 35 may comprise one or several combined toilet grey water systems 1. The combined toilet grey water system 1 is connected via a vacuum tubing system to the vacuum waste water system 15 as shown in FIG. 5.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims. In the claims, the word "comprising" does not exclude other elements or steps, and the indefinite article "a" or "an" does not exclude a plurality. Any reference signs in the claims should not be construed as limiting the scope.

LIST OF REFERENCE SIGNS 1 combined toilet grey water system
3 toilet bowl
5 basin
7 flushing valve
9 inlet of flushing valve
11 outlet of flushing valve
13 flushing line
15 vacuum waste water system
17 vacuum tubing system
19 waste water tank
21 grey water line
23 reservoir
25 first one way valve
27 overflow line
29 odor stop element
31 control unit
33 first fill level sensor
35 aircraft
37 bypass line
39 air inlet
41 second fill level sensor
43 second one way valve

The invention claimed is:
1. A combined toilet grey water system for passenger transportation vehicles, the system comprising:
   a toilet bowl for receiving waste water;
   a basin for receiving grey water;
   a flushing valve with an inlet and an outlet;
   a flushing line;
   wherein the outlet of the flushing valve is connectable to a vacuum waste water system;
   wherein the toilet bowl is connected to the inlet of the flushing valve via the flushing line; and
   wherein the basin is connected to the flushing line in such a way that the basin is connectable to the vacuum waste water system;
   wherein the basin is connected to the toilet bowl directly with a grey water line;
   wherein the toilet bowl functions as a reservoir to collect water from the basin to be flushed with a flushing of the toilet bowl;
   a control unit;
   a first fill level sensor;
   wherein the first fill level sensor is located at the toilet bowl, and is adapted for determining a fill level of grey water in the toilet bowl and for transmitting the determined fill level to the control unit;
   wherein the control unit is adapted for comparing the determined fill level with a predeterminable fill level threshold value; and
   wherein the control unit is adapted for opening the flushing valve when the determined fill level exceeds the fill level threshold value.
2. The system according to claim 1, wherein the basin is connected to the flushing line via the toilet bowl.
3. The system according to claim 1, wherein the flushing valve comprises a rotary valve or as a ball valve.
4. The system according to claim 1, further comprising:
   a first one way valve;
   wherein the first one way valve is positioned in the grey water line; and
   wherein the first one way valve is adapted to open when a fill level of the gray water line is reached and/or when a flushing device is actuated by a user.
5. The system according to claim 1, further comprising:
   an odor stop element;
   wherein the odor stop element is arranged between the basin and the flushing line; and wherein the odor stop element is adapted to prevent gases from leaving the flushing line through the basin.

6. A method for producing a combined toilet grey water system according to claim 1, the method comprising:
providing a toilet bowl for receiving waste water;
providing a basin for receiving grey water;
connecting the toilet bowl and the basin to a flushing line;
connecting an inlet of a flushing valve to the flushing line; and
connecting an outlet of the flushing valve to a vacuum waste water system;
wherein the basin is connected to the flushing line in such a that the basin is connectable to the vacuum waste water system;
wherein the basin is connected to the toilet bowl directly with a grey water line;
wherein the toilet bowl functions as a reservoir to collect water from the basin to be flushed with a flushing of the toilet bowl;
providing a control unit;
providing a first fill level sensor located at the toilet bowl;
determining a fill level of grey water in the toilet bowl by the first fill level sensor and transmitting the determined fill level to the control unit;
comparing the determined fill level with a predeterminable fill level threshold value by the control unit; and
opening the flushing valve by the control unit when the determined fill level exceeds the fill level threshold value.

7. An aircraft, the aircraft comprising:
a vacuum tubing system;
a waste water tank; and
a combined toilet grey water system, the combined toilet grey water system comprising:
a toilet bowl for receiving waste water;
a basin for receiving grey water;
a flushing valve with an inlet and an outlet;
a flushing line;
wherein the outlet of the flushing valve is connectable to a vacuum waste water system;
wherein the toilet bowl is connected to the inlet of the flushing valve via the flushing line; and
wherein the basin is connected to the flushing line in such a way that the basin is connectable to the vacuum waste water system;
wherein the basin is connected to the toilet bowl directly with a grey water line;
wherein the toilet bowl functions as a reservoir to collect water from the basin to be flushed with a flushing of the toilet bowl;
a control unit;
a first fill level sensor;
wherein the first fill level sensor is located at the toilet bowl, and is adapted for determining a fill level of grey water in the toilet bowl and for transmitting the determined fill level to the control unit;
wherein the control unit is adapted for comparing the determined fill level with a predeterminable fill level threshold value; and
wherein the control unit is adapted for opening the flushing valve when the determined fill level exceeds the fill level threshold value;
wherein the vacuum tubing system is arranged to connect the waste water tank with an outlet of the flushing valve of the combined toilet grey water system; and
wherein waste water from the toilet bowl and grey water from the basin are disposable through the flushing valve into the waste water tank.

* * * * *